United States Patent [19]

Beukers et al.

[11] Patent Number: 4,481,514
[45] Date of Patent: Nov. 6, 1984

[54] MICROPROCESSOR BASED RADIOSONDE

[75] Inventors: John M. Beukers; Christian B. Williams, both of Stony Brook, N.Y.

[73] Assignee: Beukers Laboratories, Inc., St. James, N.Y.

[21] Appl. No.: 356,428

[22] Filed: Mar. 9, 1982

[51] Int. Cl.³ .................... C08C 19/16; C08C 17/00
[52] U.S. Cl. .................. 340/870.1; 73/170 R; 340/870.13; 340/870.38; 455/95; 455/98; 455/128
[58] Field of Search ............... 340/870.1, 345, 870.16, 340/870.13, 870.38; 455/95, 97, 98, 96, 128; 346/34; 73/170 R

[56] References Cited

U.S. PATENT DOCUMENTS

| 2,418,836 | 4/1947 | Hawes | 340/870.1 |
| 2,939,127 | 5/1960 | Graw | 340/870.1 |
| 4,295,139 | 10/1981 | Arpino | 340/870.1 |
| 4,322,728 | 3/1982 | Ginn | 340/870.38 |

Primary Examiner—James J. Groody
Attorney, Agent, or Firm—Hopgood, Calimafde, Kalil, Blaustein & Judlowe

[57] ABSTRACT

A radiosonde for measuring atmospheric parameters, such as pressure, temperature, and humidity, includes a microprocessor interfaced with an analog-to-digital converter, which, in turn, receives sequential input signals representing the sensed atmospheric parameters, and converts those signals to corresponding digital data. This digital data is processed in the microprocessor, and applied as a digital data stream to an RF transmitter from where the data is transmitted to a remote ground processing station. A flap member on the radiosonde housing, which is movable between an open and a closed position in response to air flow, cooperates with a switch to provide a signal to the microprocessor indicating the launch and descent of the radiosonde. A preset input to the microprocessor is provided to automatically terminate transmission of meteorological data when the radiosonde has reached a predetermined altitude.

9 Claims, 3 Drawing Figures

MICROPROCESSOR BASED RADIOSONDE

The present invention relates generally to measurement apparatus, and more particularly to a radiosonde for measuring certain atmospheric parameters.

Radiosondes have long been used to provide measurement of atmospheric parameters, such as temperature, humidity, and pressure, at known locations in the atmosphere to enable meteorological patterns to be charted so that future weather patterns can be more accurately predicted. A radiosonde is sent aloft into the atmosphere by means of a balloon to which it is attached. The radiosonde includes a plurality of sensors which develop signals corresponding to the sensed parameters and a transmitter which transmits the sensed atmospheric information to receivers located at ground stations at which the received data is processed. The radiosonde also includes an antenna to receive location signals to enable the radiosonde to be located and tracked at the ground station.

The conventional radiosonde employs analog elements and techniques to provide the desired meteorological data in the form of electrical analog signals, which are proportional to the sensed weather conditions. For example, in the conventional radiosonde, the temperature and humidity elements are each resistive in nature and are connected in an oscillator circuit, the frequency of which is a function of the modified resistance of the respective sensor. The resulting outputs of the oscillator circuits at these frequencies modulate an RF carrier, and the thus-modulated carrier is transmitted to the ground station where the actual measurement of the atmospheric parameters is performed.

The process of converting the sensor outputs to corresponding electrical analog signals, however, requires a high degree of accuracy which is difficult to attain with present analog techniques. In spite of the many approaches and components that have been developed in an attempt to minimize the introduction of errors in the analog conversion process, the likelihood of meaningful measurement error still exists, and factory and/or field calibration of the conversion equipment remains necessary. In addition, attempts to increase the accuracy of these analog techniques frequently result in an increase in the cost and/or the weight of the radiosonde, both of which are undesirable from the user's point of view.

Moreover, the analog signals developed in the radiosonde must be transmitted to the ground station without distortion or interruption, such as may occur during conditions of poor telemetry reception, particularly if the data received at the ground station is to be employed by known automatic processing techniques to produce standard meteorological information. However, erroneous, noisy, or spurious data within the transmitted data base, which may occur in the known analog data-transmission schemes, often results in the selection of false significant levels of weather information.

In the conventional radiosonde the measure of the ambient pressure is generally effected by one of two techniques. One is the inclusion of an aneroid cell as a part of an oscillator circuit, the output of which is at a frequency which varies as a function of pressure change. The second form is the use of the aneroid cell to move a mechanical arm over a commutator switch plate, such as that disclosed in U.S. Pat. No. 4,143,335, assigned to the assignee of the present application. The ground station then measures the sensed pressure by counting the number of switch closures. Should the telemetry link from the radiosonde to the ground be temporarily lost, however, it is possible to miscount the switch closures and to have a resulting error in the computed pressure.

In the operation of a radiosonde, it is often desirable to provide an indication of the release or launch of the radiosonde into the atmosphere, and also to transmit a signal from the radiosonde to the ground station to indicate the termination of the radiosonde flight. In the conventional radiosonde, launch indication is achieved by the operator who, upon the release of the balloon, manually presses a button to indicate radiosonde release. An indication of flight termination is typically accomplished through the use of various timing devices, or by causing a pin to be inserted into the commutator plate to turn off the transmitter at the desired time.

The conventional launch indication technique is disadvantageous largely because it is nonautomatic and requires the performance of a manual operation, which may be overlooked during a radiosonde flight with the resultant loss in a launch-indication signal to the ground station. The conventional approach to providing a flight-termination signal is limited as to its accuracy and in the flexibility permitted in selecting the altitude at which the radiosonde flight is terminated.

It is thus a general object of the invention to provide an improved radiosonde which produces sensed atmospheric data with increased reliability and accuracy.

It is another object of the present invention to provide a lightweight, reliable radiosonde which employs digital techniques and components.

It is a further object of the invention to provide a radiosonde in which a launch indication is automatically generated upon launch.

It is yet another object of the present invention to provide a radiosonde in which an indication of flight termination is produced in a reliable manner with less complex components than in prior radiosondes.

It is still a further object of the invention to provide a radiosonde of the type described in which correct sensed pressure data is maintained even if telemetry from the radiosonde is temporarily lost.

To these ends, the present invention provides a radiosonde for measuring a plurality of different atmospheric parameters, such as pressure, temperature, and humidity, which can be represented by a signal developed by a voltage or resistive sensor. A microprocessor is interfaced with an analog-to-digital converter, which, in turn, is sequentially connected to the sensor through a multiplexer to receive electrical signals from the sensors in analog voltage or resistive form representing the measured parameters. Those signals are converted to corresponding digital data, which is applied to the microprocessor, in which the digital parameter data is processed and applied as a digital data stream to an RF transmitter from where the digital sensed data is transmitted to the ground station.

In one aspect of the invention, a flap member on the radiosonde housing, which is movable between an open and a closed position in response to air flow, cooperates with a switch to provide a signal to the microprocessor indicating the launch of the radiosonde. Means are also provided to sense the altitude of the radiosonde and to automatically terminate transmission of meteorological data to the ground station when the radiosonde has reached a predetermined altitude.

To the accomplishment of the above and to such further objects as may hereinafter appear, the present invention relates to a radiosonde substantially as defined in the appended claims, and as described in the following specification as considered with the accompanying drawings in which:

Figure 1:
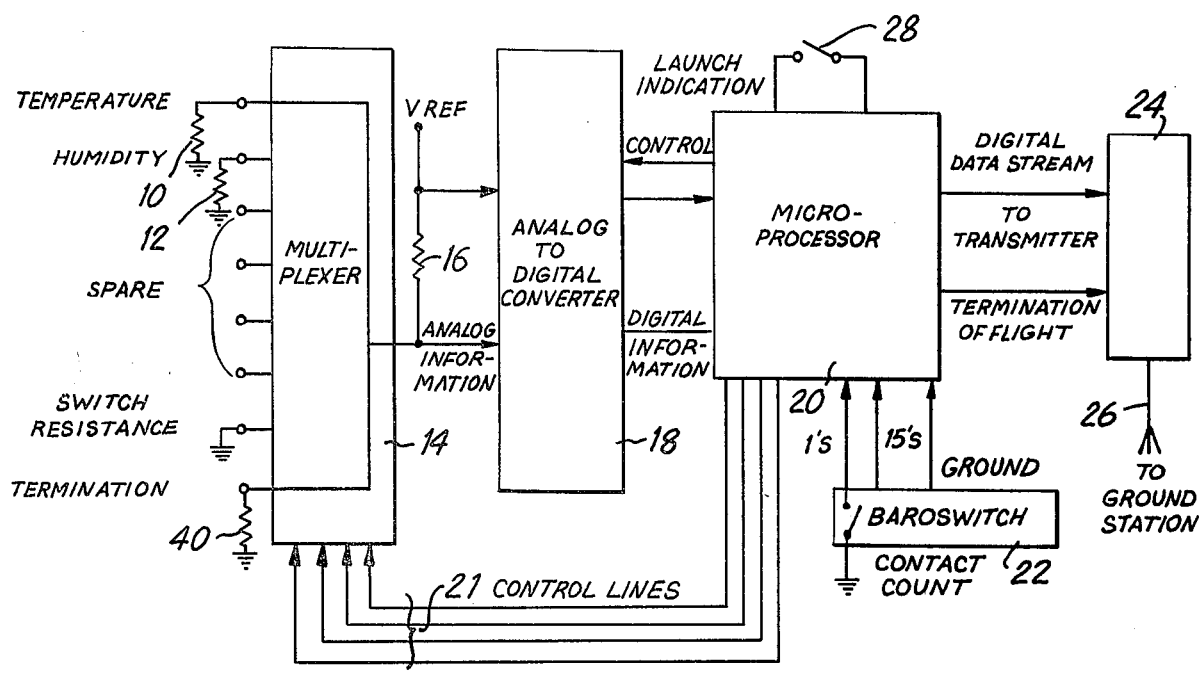
FIG. 1 is a block diagram of the radiosonde of the invention.

The radiosonde of the present invention is herein described as sensing the ambient temperature, humidity, and pressure and thereafter transmitting to a remote ground station data in binary form relating to these sensed meteorological parameters. These parameters are sensed in the radiosonde of the invention by means of sensors, which, as in the embodiment of the invention shown, may include a thermistor (temperature), a hygristor (humidity) element, and an aneroid baroswitch (pressure).

The thermistor, which is represented as a resistance 10, and the hygristor, which is represented by a resistance 12, are mounted in the radiosonde housing and are connected between ground and one input of a multi- (here eight) channel multiplexer or switch matrix 14. Other inputs to the multiplexer 14 include a switch resistance and a termination resistance, the functions of which are described in a later part of this specification. Other unused inputs to the multiplexer are designated in FIG. 1 as "spare" inputs.

As is known, the value of resistance of the thermistor 10 and of the hygristor 12 are respectively proportional to the sensed temperature and humidity. Those resistances and the other inputs to the multiplexer are sequentially placed in series with a high-stability precision reference resistance 16 connected at the output of the multiplexer and which has a stabilized reference voltage $V_{REF}$ applied to its other end. The switch resistance input to the multiplexer is a direct connection to ground. Thus, when the switch resistance channel is placed in series with the reference resistor, only the internal resistance of the multiplexer switch is measured. This measurement thus serves as reference for the data measurements made on the temperature and humidity channel measurements.

The reference voltage is placed across the reference resistor 16 and the sensed parameter resistance to ground, and is thus an accurate indication or representation of the sensed parameter whose resistance at that time (10 or 12) is connected through the multiplexer 14 in series between the reference resistor 16 and ground. That voltage is applied to the input of an analog-to-digital converter 18 in analog form, and is converted therein in a known manner to a corresponding digital signal or count, which is also an accurate indication of the data sensor resistance value. In one embodiment of the invention, the count produced by converter 18 is in the range of 0 to 1999 depending on the value of the sensor resistance 10 or 12, which, in turn, represents the sensed temperature or humidity, respectively.

The digital data or count produced in converter 18 is applied to a microprocessor 20, which processes the input sensor information in accordance with a preset program. In one embodiment of the invention, the output converter 18 is buffered and formatted into an ASCII serial data stream transmitted at 300 baud rate. In addition, the microprocessor 20 adds preamble, parity, and baud rate information into the data stream in accordance with the program, the implementation of which is considered to be within the skill of the average programmer and is therefore not further described herein. The microprocessor 20 also applies to multiplexer 14 on control lines 21 the binary signals to control the switching sequence of multiplexer 14, which, in accordance with the control signals, sequentially connects the inputs to the multiplexer to its output, and thus to the input of the analog-to-digital converter.

Microprocessor 20 is also programmed to process an input that reflects the sensed ambient pressure. To this end, in the embodiment of the invention herein described, the microprocessor receives a count signal from a temperature-compensated aneroid cell or baroswitch 22. Thus, baroswitch 22 may include a pressure-sensitive diaphragm and an arm connected to the diaphragm for movement along a commutator plate containing a plurality of, for example, 180, contacts. Depending on the ambient pressure, the arm is moved across the plate with changing (increasing or decreasing) pressure to engage sequentially the contacts.

The number of contact closures or commutator switch closures made by the arm as it moves along the commutator plate in accordance with the sensed ambient pressure is presented as a count signal to microprocessor 20, which maintains a count of the switch contacts. As each new contact is made by the baroswitch arm, the microprocessor 20 increments the stored count of contact closures. This count is transmitted periodically to the base station along with the formatted temperature and humidity data by transmitter 24, which in the embodiment shown, is a 403 mHz transmitter modulated by the digital data stream. The combined meteorological binary data is transmitted by antenna 26 to the ground station where the weather data is processed. In particular, at the ground station the count of pressure switch closures received from the radiosonde is converted to actual pressure data from calibrated data, which is in the form of absolute pressure as a function of the received contact count. The contact count is preset to zero in response to a launch signal produced in the radiosonde at the moment of launch in a manner now described.

Figure 2:
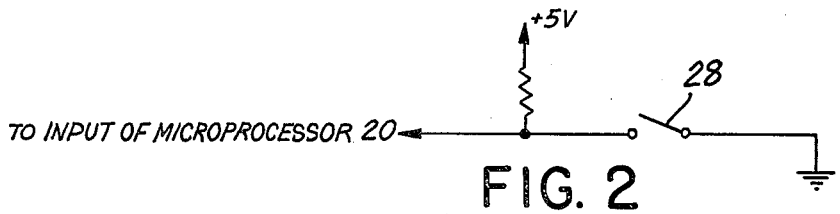
FIG. 2 is a schematic diagram of the launch indication circuit of the radiosonde.

To this end, a reed switch 28 is connected in circuit with an input to the microprocessor, as shown in FIG. 1. As more specifically shown in FIG. 2, reed switch has one contact connected to ground, and its other contact, when the switch is in its closed condition, is connected to a +5 V source and to the input of the microprocessor. Thus, when the reed switch is open, a +5 V signal is applied to one input of the microprocessor indicating a first condition, and when it is closed that input is connected through the closed reed switch to ground to represent a second condition to the microprocessor.

Figure 3:
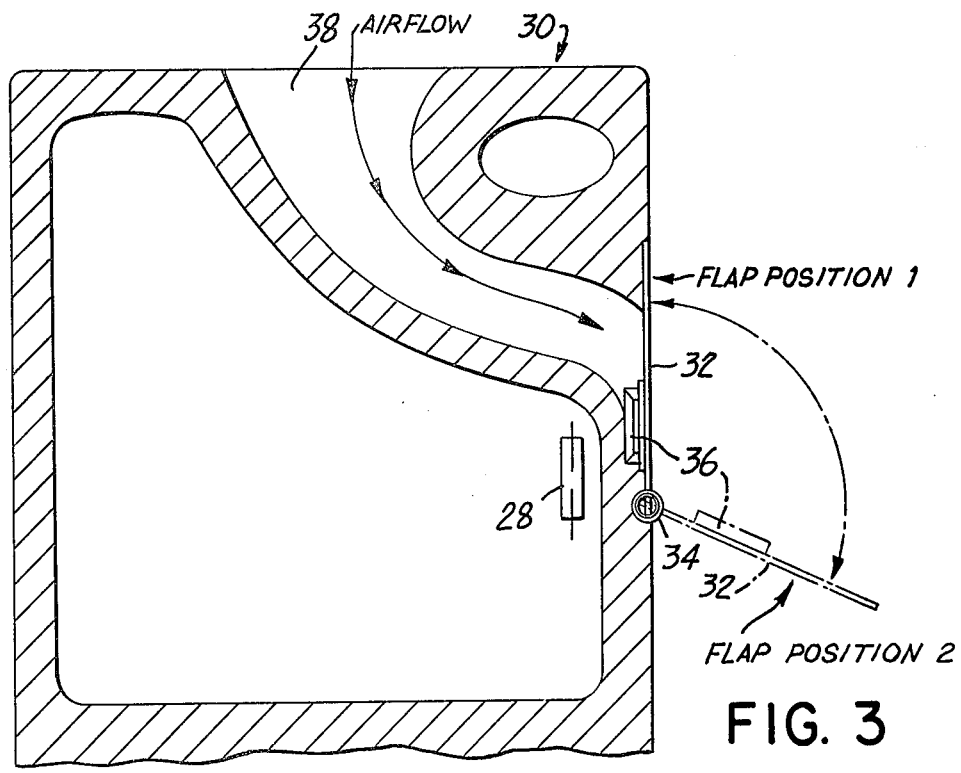
FIG. 3 is a cross-sectional view of the radiosonde housing showing the position of the flap and the reed switch.

As shown in FIG. 3, the reed switch 28 is mounted within a radiosonde housing 30, which also contains the circuitry and sensors illustrated in block form in FIG. 1. Positioned proximate to the reed switch is a flap 32 mounted at its inner end to the housing 30 by means of a hinge 34. Flap 32 carries on its inner surface a permanent magnet 36.

When the flap 32 is in its normal or closed position shown as position 1 in FIG. 3, its upper, unhinged end covers the lower narrow opening of an air duct 38 formed in the radiosonde housing. In this position of the flap, magnet 36 is in proximity to the reed switch and will cause the reed switch to be closed. When the radiosonde is launched or released into the atmosphere, air flowing through the duct 38 causes the flap to move to the open position shown as position 2 in FIG. 3. When this occurs, the magnet 36 moves away from the reed switch which will cause the reed switch to open.

The flap 32 will remain in its open position during the ascent of the radiosonde until balloon burst at which time the radiosonde will begin its descent to earth. At this time, the instantaneous reverse-direction air flow over the radiosonde and the free-fall acceleration of the radiosonde will cause flap 32 to return to its closed position, once again closing the reed switch, which thereupon applies an "end of flight" (ground) signal to the microprocessor. In this manner, the microprocessor will automatically receive a signal indicating first the launch and then the descent of the radiosonde. That signal, along with the other meteorological (temperature, humidity, and pressure) signals, are applied to the transmitter for transmission to the ground station.

If desired, the output of the transmission 24 may be terminated whenever the radiosonde reaches a predetermined altitude. This is effected in the radiosonde of the invention by the connection of a resistor 40 having a predetermined resistance value as one input to the multiplexer 14. The value of resistor 40 is sequentially connected to an input of the converter 14 along with the other inputs, such as resistances 10 and 12, under the control of the microprocessor control signal on lines 21 as described above. This resistance is converted first to a voltage and then to a corresponding binary signal or count in converter 14 as also described above. This termination count or number is applied to the microprocessor where it is compared to the baroswitch or pressure contact count, which, as noted, is a function of the pressure and thus the height of the radiosonde, as the balloon rises. When the two counts reach a predetermined ratio, say 10 to 1, as determined in the microprocessor, the microprocessor sends a signal to the transmitter to turn off the transmitter. In this manner, the radiosonde can be preset by presetting the value of resistor 40 to cease data transmission when the radiosonde reaches a certain predetermined altitude.

It will be appreciated that although the radiosonde of the invention has been described hereinabove with respect to a single embodiment, variations to that embodiment may be made without necessarily departing from the spirit and scope of the invention.

What is claimed is:

1. A radiosonde comprising a plurality of means for sensing selected ambient meteorological conditions, means operatively coupled to said sensing means for producing a corresponding plurality of electrical analog signals representative of the sensed meteorological parameters, means operatively connected to said analog signal producing means for converting said analog signals into corresponding binary signals, switching means operatively interposed between said sensing means and said converting means for sequentially operatively connecting each of said sensing means to said converting means, reference means operatively connected to the output of said switching means and the input of said converting means, said switching means being effective to sequentially connect said sensing means to said reference means, thereby to develop an analog signal at said reference means that reflects the parameter sensed by the one of said sensing means then being operatively connected by said switching means to the input of said converting means, a microprocessor operatively connected to said converting means for processing said binary signals, and transmitter means operatively connected to said microprocessor for transmitting a signal modulated by said binary signals to a remote ground station.

2. The radiosonde of claim 1, in which said reference means includes a reference resistor connected to the output of said switching means and to the input of said converting means, and a reference voltage applied to said reference resistor, said analog signals being voltages developed across said reference resistor and the resistive value of said sensor then connected to said reference resistor through said switching means.

3. The radiosonde of claim 1, in which said microprocessor provides binary control signals to said switching means to control the sequential switching operation thereof.

4. The radiosonde of claim 1, further including means operatively connected to said microprocessor for sensing the ambient pressure and for producing a count signal representative of the sensed pressure, said microprocessor including means for storing and updating the count provided by said pressure-sensing means.

5. The radiosonde of claim 1, further comprising a termination resistance of a predetermined value connected as one input of said switching means, and means included in said converting means for producing a binary termination count corresponding to the value of said termination resistance, said microprocessor including means for comparing said pressure count and said termination count and for producing a transmission-terminate signal when said pressure and termination counts bear a predetermined relation to one another.

6. The radiosonde of claim 1, further comprising means for applying a launch signal to said microprocessor upon the initiation of launch of the radiosonde.

7. The radiosonde of claim 6, in which said launch signal indication means includes switch means and switch control means mounted for movement proximate to said switch means from a first to a second position to modify said switch means from an open to a closed condition, said switch means being operative in one of its said first and second conditions to provide a launch indication signal.

8. The radiosonde of claim 7, in which said switch control means include a magnet carried by a flap member mounted for pivotal movement on the radiosonde housing, said housing also including an air duct which terminates near one end of said flap member when the latter is in one of its said first and second positions such that air flow through said duct upon the launch of the radiosonde causes said flap member to move from its said one of said first and second positions to the other of its said first and second positions, thereupon to move said switch means from one of its said first and second conditions to the other of its said first and second conditions.

9. In a radiosonde including a housing, an air duct formed in said housing, a flap member pivotably mounted to said housing at one of its ends and having its other end normally positioned at one end of said duct, a magnet carried by said flap member, and a switch connected to a voltage source located in said housing proximate said magnet when said flap member is in its said closed position and placed in one condition thereby, said flap member being movable away from its said closed position in response to air movement through said duct to move said magnet away from said switch and to place said switch in a second opposite condition, said switch thereby being effective to produce a launch signal upon the launch of the radiosonde.

* * * * *